No. 791,167. PATENTED MAY 30, 1905.
G. M. SPENCER.
AUTOMATIC VALVE MECHANISM.
APPLICATION FILED JUNE 27, 1904.
2 SHEETS—SHEET 1.
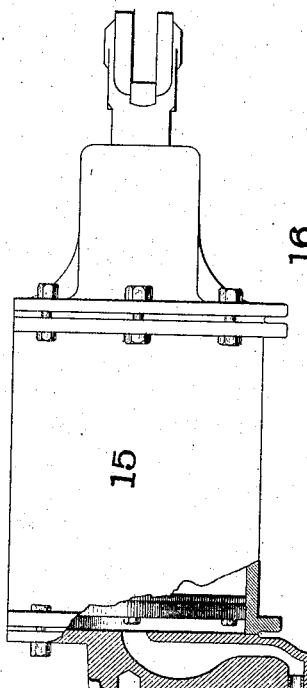
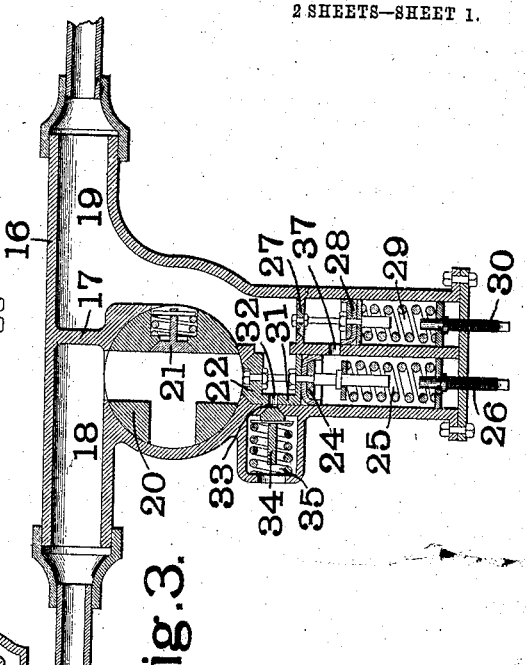
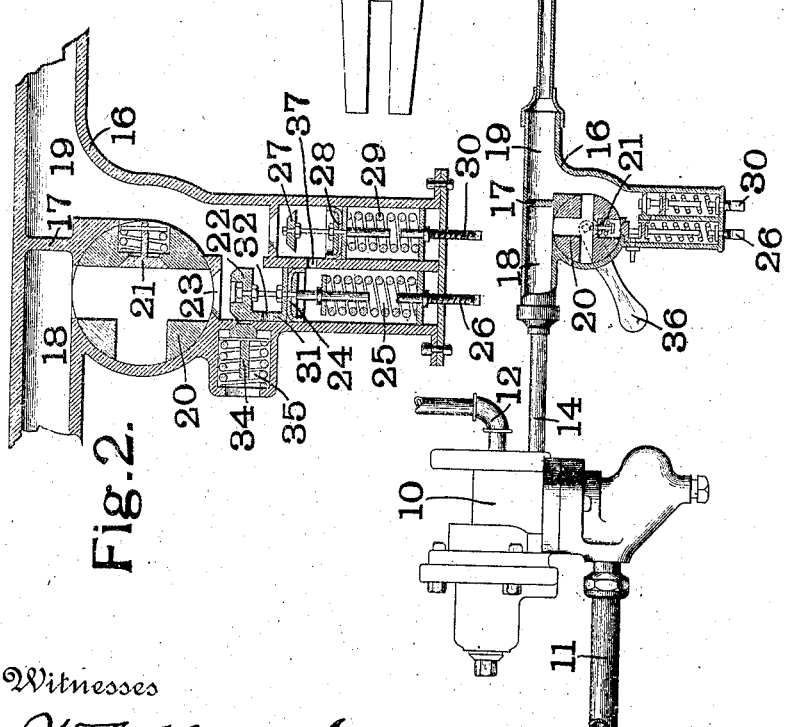
Witnesses
W. A. Alexander
Fred Henkel
Inventor
G. M. Spencer.
By Attorneys

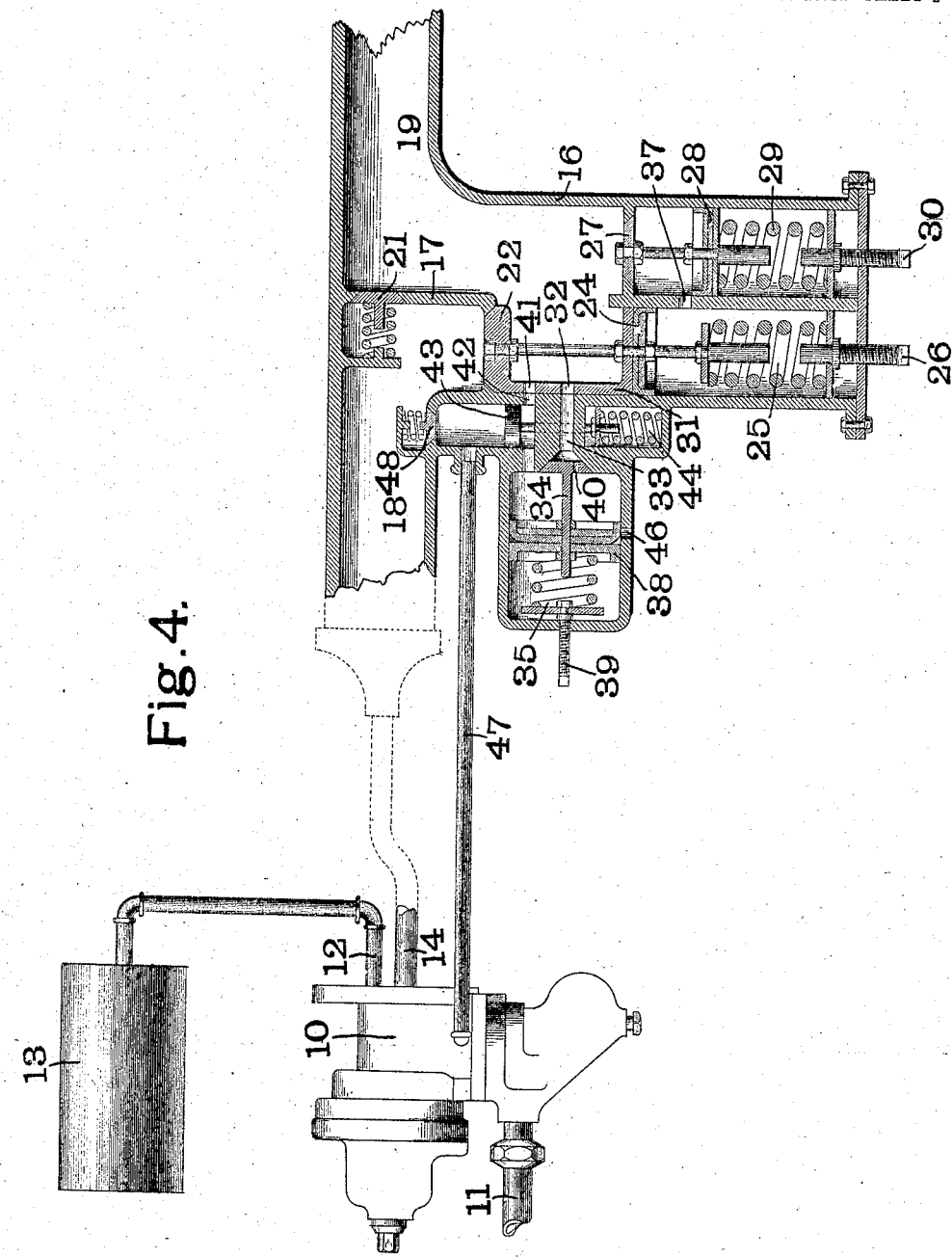

No. 791,167.

Patented May 30, 1905.

UNITED STATES PATENT OFFICE.

GEORGE M. SPENCER, OF ST. LOUIS, MISSOURI, ASSIGNOR OF ONE-HALF TO CHRISTOPHER J. GRELLNER, OF ST. LOUIS, MISSOURI.

AUTOMATIC VALVE MECHANISM.

SPECIFICATION forming part of Letters Patent No. 791,167, dated May 30, 1905.

Application filed June 27, 1904. Serial No. 214,252.

*To all whom it may concern:*

Be it known that I, GEORGE M. SPENCER, a citizen of the United States, residing at the city of St. Louis, in the State of Missouri, have invented a certain new and useful Automatic Valve Mechanism, of which the following is such a full, clear, and exact description as will enable any one skilled in the art to which it appertains to make and use the same, reference being had to the accompanying drawings, forming part of this specification.

My invention relates to a valve mechanism for automatically cutting off the supply of pressure to a brake-cylinder or other pressure-receiving device when the pressure therein has reached a predetermined amount.

My invention is especially adapted to be used in connection with the ordinary fluid-pressure-brake mechanism, but may be used in connection with any similar device which is adapted to receive a predetermined amount of pressure.

In the accompanying drawings, which illustrate my device in connection with a fluid-pressure-brake mechanism, Figure 1 is a general view partly in section. Figs. 2 and 3 are enlarged sectional views showing the parts in different positions, and Fig. 4 is a view showing a modified form of construction.

Like marks of reference refer to similar parts in the several views of the drawings.

10 represents the ordinary triple valve, to which pressure is admitted from the train-pipe 11. Leading from the triple valve 10 is a pipe 12, which extends to the auxiliary reservoir 13. 14 is a pipe which leads from the triple valve 10 to the brake-cylinder 15. All these parts may be of any usual and well-known construction.

Interposed in the pipe 14 is my automatic valve mechanism, which is preferably contained in a single casing 16, as shown in the drawings, although this is not essential. The casing 16 is divided, by means of a partition 17, into two parts 18 and 19, respectively.

In the form of my device shown in Figs. 1, 2, and 3 a three-way valve 20 is interposed between the parts 18 and 19. When the three-way valve 20 is in the position shown in Fig. 1, the automatic valve mechanism is cut out of operation and the brake will operate in the usual manner. When, however, the three-way valve 20 is in the position shown in Fig. 2 and 3, my automatic valve mechanism will be thrown into operation. The three-way valve 20 is provided with a check-valve 21 for allowing the fluid to pass back from the brake-cylinder 15 to the triple-valve mechanism 10 after the application of power to the brake.

22 is the main valve of my device, which coöperates with a seat 23 to close the communication between the parts 18 and 19 when the automatic valve mechanism is in operation. The valve 22 is connected to a piston 24, which is under the tension of an adjustable spring 25. The tension of this spring 25 is adjusted by a screw 26. Adjacent to the piston 24 is an auxiliary valve 27, which communicates with the chamber 19 of the valve mechanism. This valve 27 is connected with a piston 28, which is normally held in position by a spring 29. The spring 29 is adjusted by means of a set-screw 30. Extending between the main valve 22 and the piston 24 is a part 31, which acts as a slide-valve. This part 31 is provided with a port 32, which when the main valve 22 is in normal position registers with a port 33, which is closed by a valve 34, held in position by a spring 35. This valve 34 acts as a relief-valve, as will be hereinafter described.

The operation of my device is as follows: When pressure is admitted from the auxiliary reservoir 13 through the triple valve 10 to the pipe 14, if the three-way valve 20 is in the position shown in Fig. 1 the automatic valve mechanism will be cut out of operation and the brake will operate in the ordinary manner. I intend to use this construction in connection with freight-trains, so that when the cars are loaded they may receive a full application of power from the auxiliary valve 13. When, however, the cars are empty, the three-way valve 20 is turned by means of the handle 36 in the position shown in Figs. 2 and 3. In this position when the application of power is made the passage of the fluid from the chamber 18 to the chamber 19 will be resisted by the main valve 22. The tension of the spring 25, however, is such that the pressure of the fluid will overcome its resistance and open the said main valve 22. This will allow the passage of the fluid from the chamber 18 to the chamber 19, and consequently will allow it to enter the brake-cylinder 15. As soon as the pressure in the brake-cylinder 15 has reached the predetermined amount it will overcome the tension of the spring 29 and open the valve 27. The piston 28 will prevent the pressure of the fluid from coöperating with the spring 29. The passage 37, communicating with the space behind the piston 24, will allow the passage of the fluid behind the said passage and, in conjunction with the tension of the spring 25, will close the main valve 22, and thus retain a surplus of pressure in the auxiliary reservoir 13. I intend in practice to allow a greater pressure in the brake-cylinder 15 than will overcome the tension of the spring 35, and consequently when the main valve 23 is seated this valve 35 will be opened and allow a certain amount of the fluid in the brake-cylinder 15 to escape, so that the pressure will be somewhat diminished after the first application of power is made. It will be evident, however, that when the main valve 22 is open the relief-valve 34 will be cut out of operation, so that no reduction will be made until the pressure in the brake-cylinder 15 has reached the desired amount. In case pressure should leak from the cylinder 15 after the above operations have taken place, it will be evident that the valve 22 will again be opened to allow additional pressure to enter from the auxiliary 13 to bring the pressure in the brake-cylinder 15 again to the desired amount.

In Fig. 4 I have shown a modification in which the three-way valve 20 is dispensed with and the check-valve 21 placed in the partition 17. In this construction the main valve 23 and auxiliary valve 27 are of substantially the same form as already described. In this construction, however, I prefer to use a modified form of the relief-valve, by means of which the pressure in the brake-cylinder can be maintained for a definite length of time before it is reduced. In this construction the valve 34 has secured to its stem a piston 38, against which the spring 35 bears, and I also prefer to make the spring 35 adjustable by means of a set-screw 39. The valve 34 is provided with a small vent 40, the size of which is regulated so as to allow sufficient fluid to operate the piston 38 in a given length of time. In this construction I also provide the part 31 with a second port 41, normally registering with the port 42, leading to the piston 38. The port 42 is adapted to be closed by means of a piston-valve 43. This valve 43 is normally held open by means of a spring 44. The space behind the valve 43, however, communicates, by means of a pipe 47, with a portion of the triple valve 10, which is only opened when an emergency stop is made. Consequently the port 42 will normally remain open, so that the surplus pressure will be immediately vented upon the closing of the valve 22. When, however, an emergency stop is made, pressure will be admitted behind the piston-valve 43 and the port 42 will be closed, so that after the seating of the main valve 23 pressure will be admitted to the piston 38 only through the small vent 40, and consequently an appreciable amount of time will be required to raise the pressure behind the piston 38 to an amount sufficient to overcome the spring 25 and open the relief-port 46. The pressure behind the piston-valve 43 is vented into the chamber 18 by means of a small relief-valve 48 after the emergency stop has been made, so that the piston-valve 43 can again resume its normal position.

It will be evident that my valve mechanism provides a means by which the pressure in the brake-cylinder 15 can be positively regulated irrespective of the amount of pressure carried by the auxiliary reservoir 13, and also regardless of the relative capacities of the said auxiliary reservoir and the brake-cylinder, while in the present form of brake mechanism when an emergency stop is made the pressure between the auxiliary reservoir and the brake-cylinder must be equalized, and consequently the amount of pressure received by the brake-cylinder will depend upon the relative capacity of the reservoir and the cylinder and the pressure at which the air is carried in the auxiliary reservoir. By means of the three-way-valve mechanism 20 my automatic valve device may be entirely cut out, as has been hereinbefore explained, and the brake-cylinder 15 allowed to receive the full pressure from the auxiliary reservoir, as in the present practice. By this means I am enabled to apply a different pressure to a loaded car from that received by an empty car, and consequently the efficiency of the braking system is greatly enhanced, as it will be evident that much more pressure is needed to retard the movement of a loaded car than is required to retard the movement of an empty car. In passenger-cars the difference between load and empty is immaterial, and consequently the form shown in Fig. 4 may be used, in which the three-way valve 20 is dispensed with.

Having fully described my invention, what I claim as new, and desire to secure by Letters Patent of the United States, is—

1. The combination with the triple valve and brake-cylinder of a fluid-pressure brake, of connections between said triple valve and cylinder, a second valve interposed in said connections, a third valve communicating with said connections, and means controlled by the movement of said third valve for actuating said first-named valve to close said connections.

2. The combination with the triple valve and brake-cylinder of a fluid-pressure brake, of connections between said triple valve and cylinder, a second valve interposed between said triple valve and cylinder, a third spring-operated valve communicating with said connections between said second-named valve and said cylinder, and means controlled by the movement of said third-named valve for actuating said second-named valve to close said connections.

3. The combination with the triple valve and brake-cylinder of a fluid-pressure brake, of connections between said triple valve and cylinder, a second valve interposed in said connections, a third valve communicating with said connections, and means controlled by the movement of said third-named valve for admitting fluid behind said second-named valve to close said connections.

4. The combination with the triple valve and brake-cylinder of a fluid-pressure brake, of connections between said triple valve and cylinder, a second spring-controlled valve interposed in said connections, a third spring-controlled valve communicating with said connections between said second-named valve and said cylinder, and means controlled by the movement of said third-named valve for admitting fluid behind said second-named valve to close said connections.

5. The combination with a fluid-pressure supply and a pressure-receiver, of connections between said supply and receiver, an automatic valve mechanism for closing said connections when the fluid in said receiver has reached a predetermined pressure, and means for cutting said valve mechanism into and out of operation.

6. The combination with a fluid-pressure supply and a pressure-receiver, of connections between said supply and receiver, an automatic valve mechanism in said connections, a relief-valve, and means for cutting said relief-valve out of operation when said automatic valve is open.

7. The combination with a triple valve and brake-cylinder, of connections between said valve and cylinder, and means independent of said triple valve for closing said connections when the fluid in said cylinder has reached a predetermined pressure.

8. The combination with the triple valve and brake-cylinder of a fluid-pressure brake, of connections between said valve and cylinder, an automatic valve in said connections for controlling the flow of fluid from said triple valve to said brake-cylinder, and a check-valve in said connections for permitting the return of fluid from said cylinder.

9. The combination with the triple valve and brake-cylinder of a fluid-pressure brake, of connections between said valve and cylinder, an automatic valve mechanism in said connections for closing said connections when the fluid in said cylinder has reached a predetermined pressure, and means for cutting said valve mechanism into and out of operation.

10. The combination with the triple valve and brake-cylinder of a fluid-pressure brake, of connections between said valve and cylinder, an automatic valve mechanism in said connections, a relief-valve, and means for throwing said relief-valve out of operation when said automatic valve mechanism is open.

11. The combination with a fluid-pressure supply and a pressure-receiver, of connections between said supply and receiver, an automatic valve mechanism in said connections, a relief-valve normally communicating with said connections through two ports, and means controlled by the pressure in said connections for closing one of said ports.

12. The combination with a fluid-pressure supply and a pressure-receiver, of connections between said supply and receiver, an automatic valve mechanism in said connections, a relief-valve normally communicating with said connections through two ports of different sizes, and means controlled by the pressure in said connections for closing the larger of said ports.

13. The combination with a fluid-pressure supply and a pressure-receiver, of connections between said supply and receiver, an automatic valve mechanism in said connections, a relief-valve, a port connecting said relief-valve with said connections, an opening in said relief-valve, and a second port communicating with said relief-valve.

14. The combination with a fluid-pressure supply and a pressure-receiver, of connections between said supply and receiver, an automatic valve mechanism in said connections, a relief-valve, a piston controlling said relief-valve, two ports communicating with said piston, and means for closing one of said ports.

15. The combination with a brake mechanism, of a relief-valve interposed in the fluid-pressure connections, said relief-valve being provided with a piston for controlling its movement, and a port in said relief-valve for admitting pressure to said piston.

16. The combination with a brake mechanism, of a relief-valve interposed in the connections of said mechanism, said relief-valve being provided with a piston, a port in said relief-valve communicating with said piston, a second port also communicating with said piston, and means for closing said port.

In testimony whereof I have hereunto set my hand and affixed my seal in the presence of the two subscribing witnesses.

GEORGE M. SPENCER. [L. S.]

Witnesses:
 FRED HENKE,
 D. C. BETJEMAN.